July 6, 1926.
W. MAYER
TRAILER HOIST AND COUPLER
Filed Oct. 7, 1925   3 Sheets-Sheet 1
1,591,857
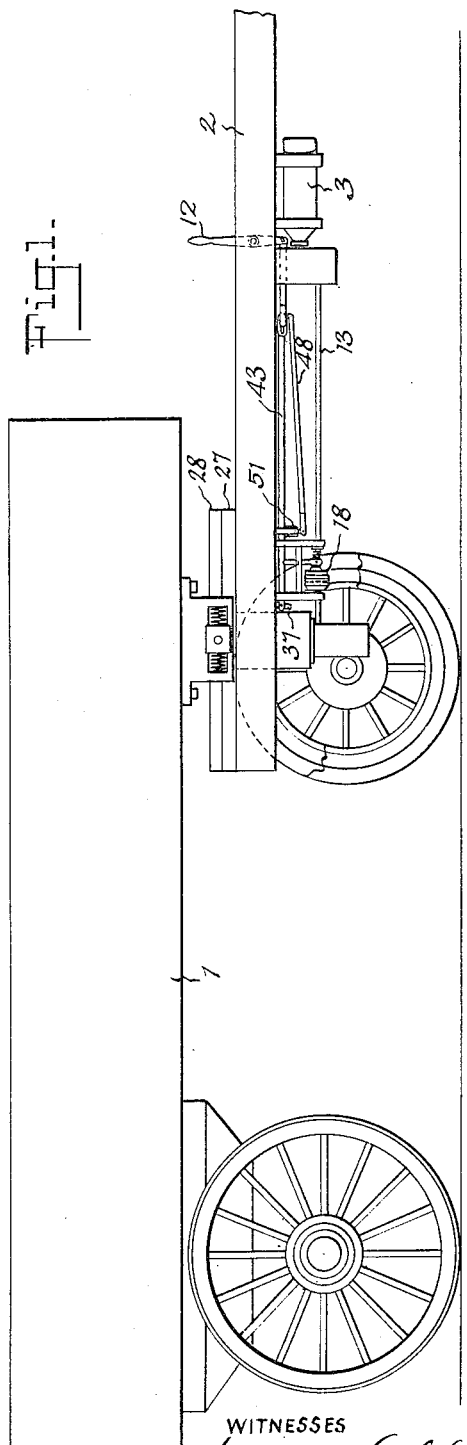
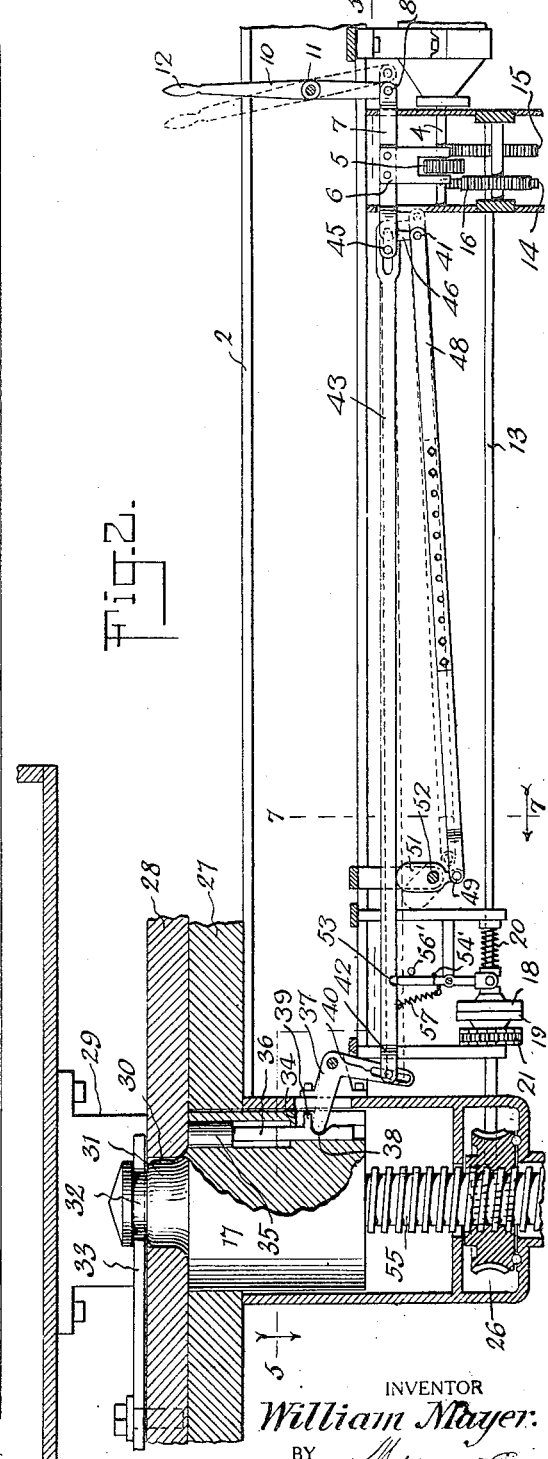
INVENTOR
William Mayer
BY
ATTORNEYS
WITNESSES

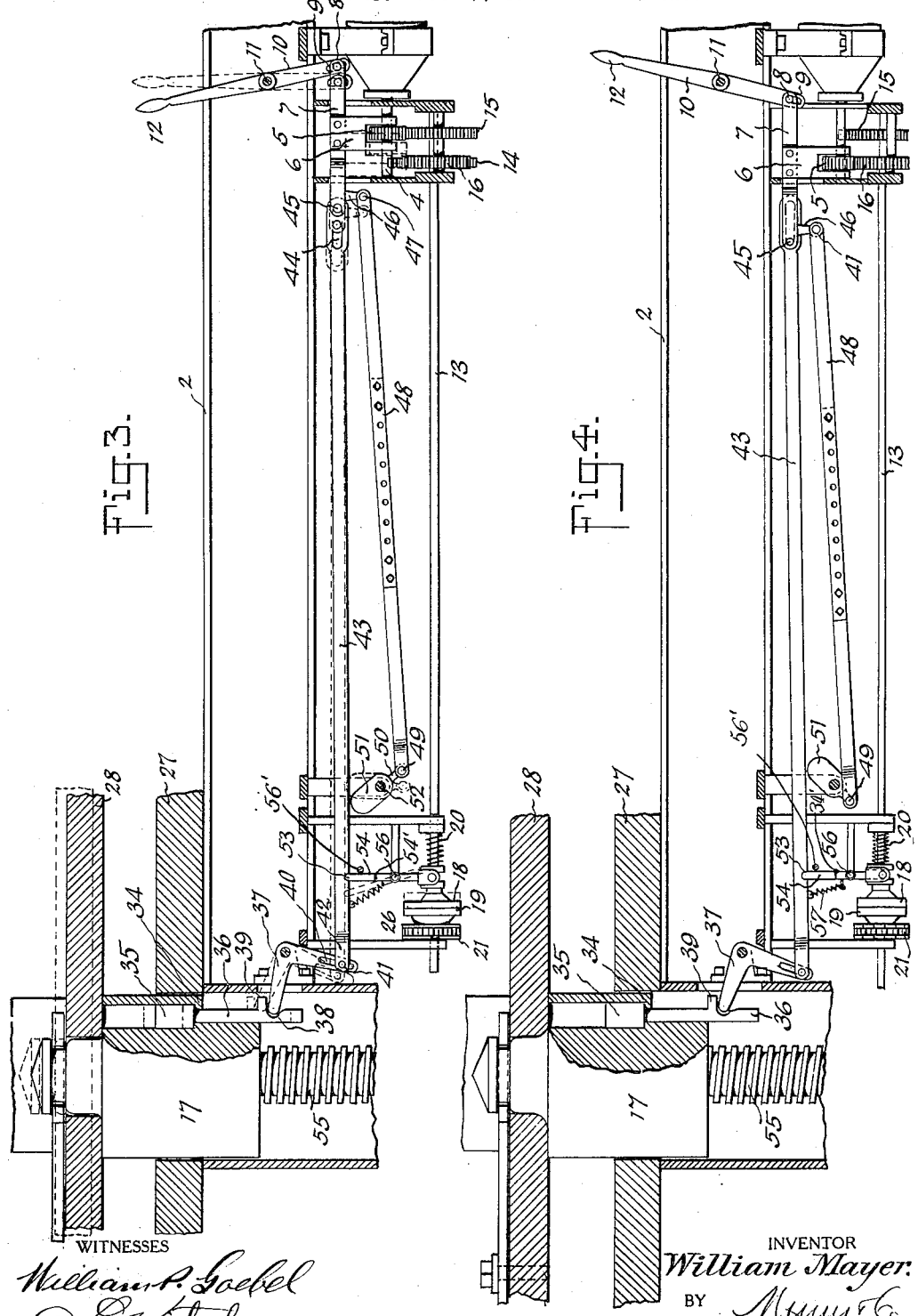

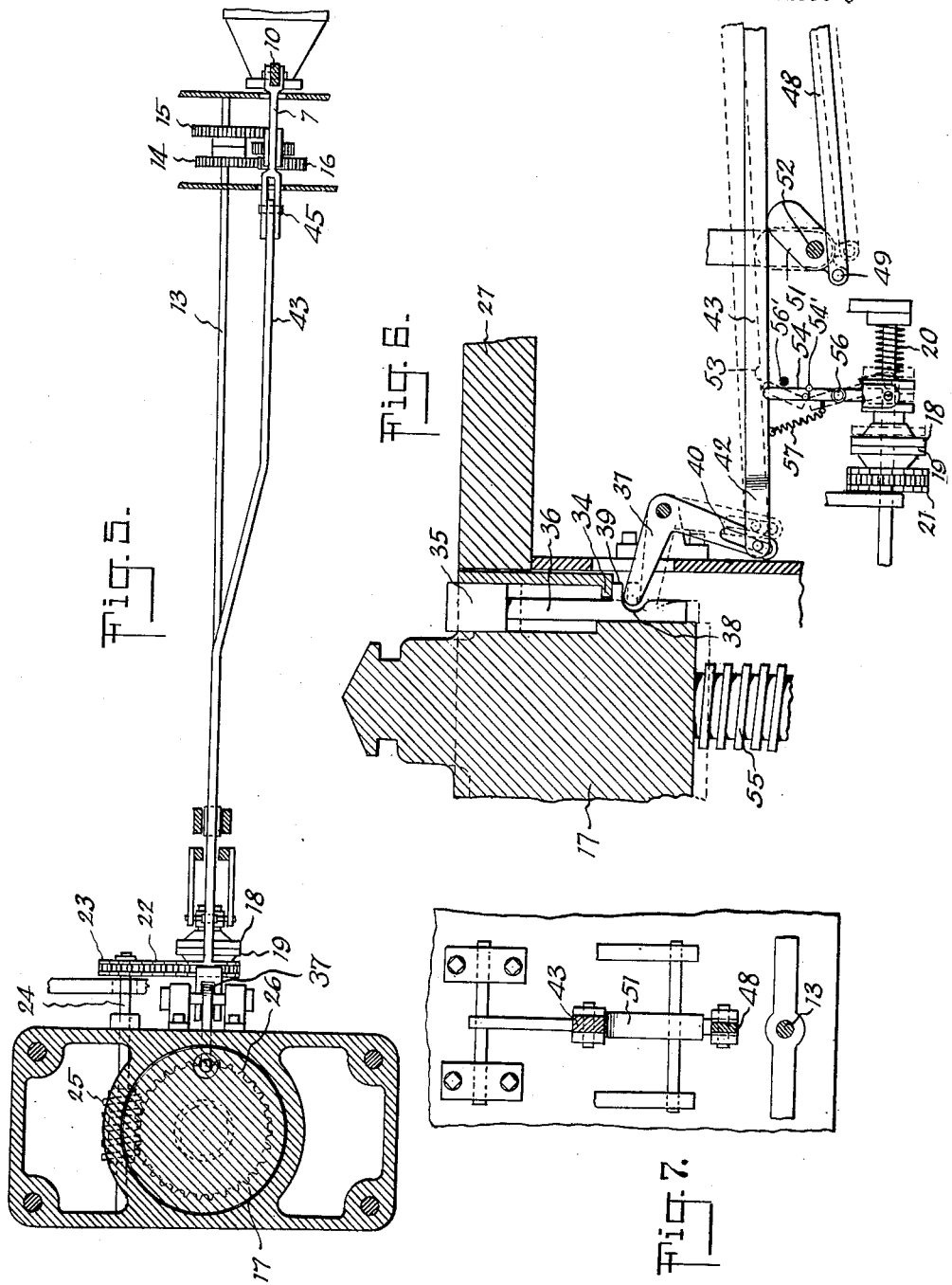

Patented July 6, 1926.

1,591,857

UNITED STATES PATENT OFFICE.

WILLIAM MAYER, OF BROOKLYN, NEW YORK.

TRAILER HOIST AND COUPLER.

Application filed October 7, 1925. Serial No. 61,102.

REISSUED

This invention relates to trailer hoists and couplers and has for an object to provide an improved construction which may be readily manipulated by the driver of a tractor for readily raising and lowering the front end of the trailer and for causing a ready connection and disconnection of the trailer with the tractor.

Another object of the invention is to provide an improved throw-out mechanism for a trailer hoist and coupler wherein the driving or power mechanism will be immediately thrown out of operation as soon as the hoist has reached its extreme upper or lower position.

A still further object, more specifically, is to provide a trailer hoist and coupler with a means for turning on the power for causing an actuation of the various parts and also means for automatically restoring the controlling parts to their former position so as to automatically throw off the power when the hoist and coupler have reached their destined position.

An additional object of the invention is to provide an improvement over my co-pending application, Serial No. 44,518, the improvement consisting principally in the mechanism for automatically throwing out the hoisting coupling means.

In the accompanying drawings—

Figure 1 is a side view of part of a tractor with a trailer associated therewith, said tractor and trailer disclosing an embodiment of the invention.

Figure 2 is an enlarged vertical sectional view through the front part of the showing in Figure 1.

Figure 3 is a view similar to Figure 2 but showing the parts in a raised position.

Figure 4 is a view similar to Figure 3 but showing the parts shifted to a position for lowering the trailer.

Figure 5 is a sectional view through Figure 2 on line 5—5.

Figure 6 is an enlarged fragmentary sectional view illustrating how the power is thrown off when the hoist mechanism has been lowered to its extreme down position.

Figure 7 is a fragmentary sectional view through Figure 2 on line 7—7.

In trailers and tractors now in common use, various means have been provided for connecting the trailer with the tractor and also various means have been provided for operating this connection to raise and lower the front end of the trailer so as to properly effect the connecting and disconnecting. These various hoisting or raising means have been connected in some manner with a power element of the tractor and, consequently, various means have been provided for turning on and off the power. In the present invention, an improved connecting structure has been provided for the hoist and coupler and also an improved control device intermittently associated with the other parts for throwing off the power when the hoist mechanism is in either the uppermost or the lowermost position.

Referring to the accompanying drawings by numerals, 1 indicates a trailer and 2 a tractor. The tractor 2 is provided with an engine of any desired kind supplied with a transmission 3 of any desired type, said transmission being provided with a shaft 4 rotated whenever the engine of the tractor 2 is running. This shaft is adapted to rotate in one direction continually. A pinion 5 is splined on shaft 4 and, therefore, continually rotates therewith, said pinion being shifted back and forth along shaft 4 by the forked member 6 rigidly secured to the rod 7. This rod at one end is provided with a pin 8 extending through the slot 9 (see Figure 3) which is formed in the lower end of the hand lever 10. The hand lever 10 is pivotally mounted at 11 so that the operator may grasp the grip 12 and swing the lever back and forth as desired for moving the pinion 5 to the position shown in Figure 3, Figure 2 or Figure 4. Normally, the pinion 5 is in the position shown in Figure 2 which is an inoperative or neutral position.

To cause the hoist to raise the trailer, lever 10 is moved to the dotted position shown in Figure 2 manually. To cause the trailer to be lowered or to cause the hoist mechanism to move downwardly, lever 10 is moved to the position shown in Figure 4. From either of these two extreme positions, that is, the raised or lowered position, lever 10 and associated parts may be moved to the neutral position shown in Figure 2 automatically or manually. A power shaft 13 is mounted in suitable bearings on the tractor 2 and is rigidly secured to the gears 14 and 15. An intermediate gear wheel or idler 16 continually meshes with gear 14 and is positioned so that when the pinion 5 is shifted to the position shown in Figure 4, said pinion will be brought into mesh with the gear wheel or idler 16. When the pinion 5 is in the position shown in Figure 3, it is in mesh with the gear wheel 15. As the idler 16 is smaller than gear wheel 14, this arrangement of gears will permit a multiplied force or leverage on the shaft 13 when the same acts to lower the coupling head or pin 17. The shaft 13 carries a clutch member 18 which is splined thereon and which is pressed against the clutch member 19 loosely mounted on shaft 13, said action being caused by the spring 20. The clutch member 19 is rigidly secured in any desired manner to the sprocket wheel 21 carrying the chain 22 which passes over the sprocket wheel 23 rigidly secured to the shaft 24 (Figure 5), which shaft is rigidly secured to the worm 25, said worm in turn being continually in mesh with the worm gear 26. When the clutch members 18 and 19 are in engagement and shaft 13 is being rotated, the head 17 will be moved positively upwardly or downwardly. Suitable means have been provided as hereinafter described for automatically moving the parts to a neutral position whenever the head 17 has reached either its uppermost or lowermost position.

In Figures 1 and 2, the parts are shown in their neutral or inoperative position with shaft 13 stationary and the trailer resting on the support or turntable 27 mounted on the tractor 2. The trailer 1 has a turntable 28 carried by suitable members 29 secured to the trailer 1. The turntable 28 is provided with an opening or bore 30 for receiving the reduced coupling portion 31 of head 17. This coupling portion is provided with an annular groove 32 for receiving a locking member or catch 33 whenever the trailer is to be connected to the tractor. If it should be desired to disconnect the trailer 1 from the tractor, the catch 33 would be moved to an open position manually and then lever 10 would be moved over to the dotted position shown in Figure 2. This would cause the pinion 5 to move with gear wheel 15 and thereby rotate the shaft 13 in such a direction as to cause the head 17 to be moved upwardly.

The driver of the tractor cannot conveniently see and in fact, usually cannot see any part of the head 17 or associated mechanism and, consequently, cannot readily determine when to move the lever 10 back to a neutral or inoperative position. Therefore, mechanism has been provided to automatically move the parts to a neutral position and, consequently, all the driver does is to move lever 10 over to the dotted position shown in Figure 2 and the parts will immediately begin to function to raise the front end of the trailer to its extreme upper position whereupon the power will be thrown off automatically. In Figure 3 the parts are shown raised to almost a full position and when raised to the dotted position shown in Figure 3, the parts will automatically function to open the clutch and shift pinion 5 to the position shown in Figure 2. This takes place by reason of the shoulder 34 striking the lower end of the enlarged portion 35 of rod 36. This rod is raised to the dotted position shown in Figure 3 and in turn will raise or shift the bell crank lever 37. It will be noted that one leg of this lever extends into the notch 38 in rod 36. A stop 39 is provided on rod 36 for purposes hereinafter fully described. One leg of the lever 37 is provided with a slot 40 through which extends the pin 41 carried by the bifurcated end 42 of the link 43. This link at the opposite or forward end is provided with a slot 44 through which extends the pin 45 of bar 7. The bar 7 is provided with a bracket or projection 46 pivotally connected at 47 to the link 48 which in turn is pivotally connected at 49 to an extension 50 of the cam 51, which cam is pivotally mounted at 52. When the cam 51 moves to the right as shown in Figure 3, it will strike the link 43 and raise the same to the dotted position. When the rod 36 has been elevated to the dotted position shown in Figure 3 it will swing lever 37 to the dotted position shown in Figure 3 which will pull rod 7 until the pinion 5 is moved to its neutral position shown in Figure 2. This same movement will cause the bracket 46 to push link 48 until cam 51 is in the dotted position shown in Figure 3 whereupon link 43 is raised so that part of the link carrying the notch 53 will be out of engagement with the end of the lever 54. It will be noted that as the link 43 moves to the dotted position shown in Figure 2, it will swing lever 54 and thereby disconnect the clutch members 18 and 19, said disconnection taking place slightly before pinion 5 moves to a neutral position. This action of shifting the pinion 5 automatically, does not require the attention of the driver. The parts are left in this position until it is desired to again lower the head 17 whereupon the driver will manually move the lever 10 to the position shown in Figure 4. This movement causes the pinion 5 to mesh with the gear wheel 16 and will also shift the links 43 and 48 until the rod 36 has been moved so that it will project a short distance above the turntable 27. As the power begins to rotate the gear wheel 26 it will let down the head 17 and if necessary, pull the same downwardly. The gear wheel 26, as shown in Figure 2, is provided with a threaded bore whereby the same is threaded onto the screw 55 which is rigidly secured to the head 17. As the head 17 moves downwardly, the lower surface of shoulder 34 will strike against the lug or projection 39 as indicated in Figure 6 and rock somewhat the bell crank lever 37 whereupon the link 43 is shifted longitudinally toward the front and as it is moved forwardly, rod 7 will be shifted so that the pinion 5 will be moved from the position shown in Figure 4 to that shown in Figure 2. As the rod 7 is shifted, link 48 will be pulled and cam 51 will be again moved to a vertical position as shown in dotted lines in Figure 6 whereupon the link 43 is moved out of engagement with the lever 54. It will thus be seen that to lower the trailer it will only be necessary for the driver to shift lever 10 to the position shown in Figure 4 and then allow the mechanism to automatically function.

As above described, when it is desired to lower the trailer or the head 17, the driver moves the lever 10 manually to the position shown in Figure 4 and the remaining mechanism will function to automatically shift the parts to the neutral position when the head has been lowered to the desired extent. The clutch members 18 and 19 and lever 54 are provided as an auxiliary means for throwing out the power when the head has reached its extreme upper position. As the trailer moves upwardly, the parts are in the full line position shown in Figure 3. As the trailer nears its highest position, rod 36 will begin to swing bell crank lever 37 and as it begins to swing this lever it will pull link 43 longitudinally and will swing lever 54 on its pivot 56 and said lever will automatically begin to move the clutch member 18 away from clutch member 19 so that the power is gradually disconnected at the same time that the pinion 5 is moved to its neutral position. The parts are so proportioned that substantially at the time that the pinion 5 moves to its neutral position shown in Figure 2. cam 51 will function to disconnect link 43 from lever 54. The movement in the other direction by rod 7 will not cause the lever 54 to function until it strikes pin 56' as the upper part thereof will swing to one side as the upper part is connected to the lower part by a hinge 54'. A suitable spring 57 acts on the lever to cause the same to again assume its position in engagement with the notch 53 when permitted. As above mentioned, the mechanism operates to automatically throw off the power when head 17 reaches its destined position whether or not it is an up position or a down position. There is in fact, three positions, namely, an extreme up position where the load is raised to the highest point as shown in dotted lines in Figure 3. The second position is shown in Figure 6 where the load is left elevated and the pin 17 withdrawn in order to move the tractor to a different point without moving the trailer. The third and the riding position is shown in Figure 2 where the members 27 and 28 are in engagement.

Shoulder 34 functions in Figure 3 to cause the power to be thrown off while in Figure 2 the turntable 28 functions to actuate the rod 36 to cause the power to be thrown off. In the intermediate or third position shown in Figure 6, the projection or lug 39 functions in connection with the shoulder 34 and through bell crank lever 37 and associated parts to cause the power to be thrown off.

When the power is thrown off automatically, the clutch functions first or before the gears have been entirely disengaged, whereby said disengagement is done easily. By adjusting the effective length of the link 48, the clutch may be caused to function sooner or later.

When the parts move to their down or lowermost position, the pin 35 will be forced downwardly and move bell crank lever 37 and link 43 to the dotted position shown in Figure 6. This movement will cause the link 43 to pull toward the right in Figure 6 against the upper end of the upper section of lever 54 and this will cause the upper section to swing around pin 56'. This swinging movement will continue until the parts assume substantially the dotted position shown in Figure 6 and the clutch is moved to a disengaged position. As the parts assume substantially the dotted position shown in Figure 6, member 52 will function to fully release the upper part of the lever 54 and permit the spring 20 to again close the clutch 18 against the action of spring 57 which is comparatively weak in respect to spring 20.

What I claim is:

1. A trailer hoist and coupler, comprising an apertured member connected with the trailer, a pin mounted on the tractor, means for raising and lowering said pin, said pin being adapted to engage said apertured member for raising said trailer and also for acting as coupling means for connecting the trailer with the tractor and means for automatically disconnecting the means for raising and lowering the pin when the pin has reached either of its extreme positions, said means including a gear shifting rod, a bell crank lever for shifting said rod, and means co-acting with said pin for shifting the bell crank lever as the pin nears either of its extreme positions.

2. A power throw-out for trailer hoists and couplers which includes a hoisting pin and driving mechanism for raising and lowering the pin, said driving mechanism being provided with a series of gears, said throw-out mechanism including a pinion adapted to be brought into mesh with each of said gears for causing the pin to be raised and lowered, a shifting structure for shifting said pinion, a link connected with said rod and having a limited independent movement, a bell crank lever having one end connected with said link, a sliding rod connected with said pin and having a limited independent movement, said rod being operatively connected with said bell crank lever for shifting the same when moved by said pin.

3. In a trailer hoist and coupler provided with a hoisting pin co-acting with the lower part of the trailer and means for operatively raising and lowering said pin, a manually actuated lever for connecting the power mechanism with the pin for actuating the pin and automatically actuated means for disconnecting said power mechanism, said last mentioned means including a rod moved in one direction by said pin when said pin has been elevated to its extreme upper position and moved in the opposite direction by the bottom of said trailer when the pin has been moved to its extreme lower position, a lever actuated by said rod, a link actuated by said lever, and means actuated by said link for shifting the means connecting the power from said power means with said pin.

4. In a trailer hoist and coupler, a hoisting pin, a source of power and a driving structure connecting said source of power with the pin for operatively raising and lowering the pin, said pin being positioned to engage the bottom of a trailer, a reciprocating member for throwing in and out said driving means, a link for automatically moving said shifting means, a bell crank lever for moving said link longitudinally, and a rod for actuating said bell crank lever, said rod being carried by said pin, said rod being slidingly mounted in said pin and positioned to be raised by said pin when it is approaching its extreme upper position and is lowered by the bottom of said trailer when the pin is moved to its extreme lowest position.

5. In a trailer hoist and coupler, a vertically movable pin, a gear having a threaded bore for receiving said screw, provided with a screw means for manually rotating said gear for moving said pin, and a reciprocating rod automatically actuated by the pin and the load to be raised thereby for disconnecting said means when the pin has reached its extreme travel in either direction.

6. A trailer hoist and coupler, comprising a hoisting pin adapted to engage the bottom of the trailer for hoisting the same, driving means for raising and lowering said pin and means for connecting said driving means with the power mechanism of the tractor, a sliding rod for shifting said connecting means to cause the pin to be moved upwardly and downwardly and to disconnect the pin from the power means, a link for reciprocating said rod, a manually actuated lever for shifting said rod, a bell crank lever for shifting said link, and means for operatively connecting said bell crank lever with said pin so that when the pin is moved to its lowermost position the trailer will cause the bell crank lever to be shifted in one direction and when the pin is moved to its highest position said pin will cause the bell crank lever to be shifted in the opposite direction.

7. A trailer hoist and coupler, comprising an apertured member connected with the trailer, a pin mounted on the tractor, means for raising and lowering said pin, said means including a plurality of trains of gears, a pinion adapted to be brought into mesh with either train of gears, and means for rotating the pinion, said pinion being adapted to engage said apertured member for raising said trailer and also for acting as a coupling means for connecting the trailer with the tractor, manually actuated means for shifting said pinion from one train of gears to the other, and automatically actuated means for shifting the pinion from either train of gears to a neutral position, said last mentioned means including an actuating member carried by said pin, said actuating member having a limited independent movement.

8. A trailer hoist and coupler, comprising an apertured member connected with the trailer, a pin mounted on the tractor, means for raising and lowering said pin, said pin being adapted to engage said apertured member for raising said trailer and also for acting as a coupling means for connecting the trailer with the tractor, a manually actuated member for connecting said raising and lowering means with the pin so as to cause the pin to function, and automatically actuated means for disconnecting said raising and lowering means from said pin, said automatically actuated means including a gear shifting structure and a clutch shifting structure.

9. A trailer hoist and coupler provided with a raising and lowering pin and means for actuating said pin, a manually actuated member for causing said means to be thrown into functioning position, automatically actuated means for causing said means to be moved to a position whereby they will not function, a clutch arranged in the means for raising and lowering said pin, and means associated with said automatically acting means for causing said clutch to be opened when the pin is moved to its extreme position in one direction.

WILLIAM MAYER.